(12) United States Patent
Matsui et al.

(10) Patent No.: US 11,192,160 B2
(45) Date of Patent: Dec. 7, 2021

(54) STRUCTURAL MEMBER

(71) Applicant: AISIN KEIKINZOKU CO.,LTD., Imizu (JP)

(72) Inventors: Hiroaki Matsui, Imizu (JP); Jin Shinmura, Imizu (JP); Kazunobu Nuno, Imizu (JP)

(73) Assignee: AISIN KEIKINZOKU CO., LTD.

( * ) Notice: Subject to any disclaimer, the term of this patent is extended or adjusted under 35 U.S.C. 154(b) by 161 days.

(21) Appl. No.: 16/425,325

(22) Filed: May 29, 2019

(65) Prior Publication Data

US 2019/0275576 A1 Sep. 12, 2019

Related U.S. Application Data

(63) Continuation of application No. PCT/JP2017/042519, filed on Nov. 28, 2017.

(30) Foreign Application Priority Data

Nov. 30, 2016 (JP) .............................. JP2016-232771

(51) Int. Cl.
*B21C 37/16* (2006.01)
*B21C 25/02* (2006.01)
*B21C 37/15* (2006.01)
*B21C 37/00* (2006.01)
*B62D 25/00* (2006.01)
*B21C 23/00* (2006.01)

(52) U.S. Cl.
CPC .............. *B21C 37/16* (2013.01); *B21C 23/00* (2013.01); *B21C 25/02* (2013.01); *B21C 37/00* (2013.01); *B21C 37/155* (2013.01); *B21C 37/158* (2013.01); *B62D 25/00* (2013.01)

(58) Field of Classification Search
CPC ....... B21C 37/16; B21C 37/00; B21C 37/155; B21C 37/158; B21C 23/00; B21C 25/02; B62D 25/00
USPC ......................................... 72/253.1
See application file for complete search history.

(56) References Cited

U.S. PATENT DOCUMENTS 3,422,648 A 1/1969 Lemelson
5,557,962 A * 9/1996 Takikawa ................ B21C 23/14
72/260
5,989,466 A * 11/1999 Kato ...................... B29C 48/12
264/40.5

FOREIGN PATENT DOCUMENTS

| EP | 1 967 299 A1 | 9/2008 |
| GB | 544 114 A | 3/1942 |
| GB | 2264253 † | 3/1995 |
| JP | H11-011345 A | 1/1999 |
| JP | 2000-096769 A | 4/2000 |

(Continued)

OTHER PUBLICATIONS

International Search Report for International Application No. PCT/JP2017/042519 dated Feb. 13, 2018.

(Continued)

*Primary Examiner* — Matthew Katcoff
*Assistant Examiner* — Smith Oberto Bapthelus
(74) *Attorney, Agent, or Firm* — Harness, Dickey & Pierce, P.L.C.

(57) ABSTRACT

The disclosure aims to provide a structural member made of an extruded material that effectively helps to reduce weight while ensuring strength and rigidity. The structural member has a varied wall thickness along an extrusion direction.

3 Claims, 4 Drawing Sheets

(56) References Cited

FOREIGN PATENT DOCUMENTS

| | | | |
|---|---|---|---|
| JP | 2001-122154 | A | 5/2001 |
| JP | 2002-035825 | A | 2/2002 |
| JP | 2002-224738 | A | 8/2002 |
| JP | 2002-225773 | A | 8/2002 |
| JP | 2003-039120 | A | 2/2003 |
| JP | 2003-326311 | A | 11/2003 |
| JP | 2007-076547 | A | 3/2007 |
| JP | 3996004 | B2 | 10/2007 |
| JP | 4216617 | B2 | 1/2009 |
| JP | 2010-070128 | A | 4/2010 |
| JP | 4611158 | B2 | 1/2011 |
| JP | 5997099 | B2 | 9/2016 |

OTHER PUBLICATIONS

Extended European Search Report for corresponding Application No. EP 17877093 dated Jul. 1, 2020 (7 pages).
Selvaggio, et al. "Extrusion of Profiles with Variable Wall Thickness", International Conference on Manufacture of Lightweight Components—ManuLight 2014; Procedia CIRP 18 (2014), pp. 15-20; 2014.†
Van Vlack, "Elements of Materials Science and Engineering Fifth Edition", p. 16, Addison Wesley Publishing Company, Reading MA, 1987.†
Beer et al, "Mechanics of Materials", pp. 67-70, McGraw-Hill Book Company, New York, NY 1981.†
Light Metal Age, "Forge-Tapering Aluminum Extrusion", Light Metal Age Article; Apr. 1951.†

\* cited by examiner
† cited by third party

CROSS-SECTIONAL VIEW ALONG LINE A-A

CROSS-SECTIONAL VIEW ALONG LINE B-B

CROSS-SECTIONAL VIEW ALONG LINE C-C

FIG. 4A
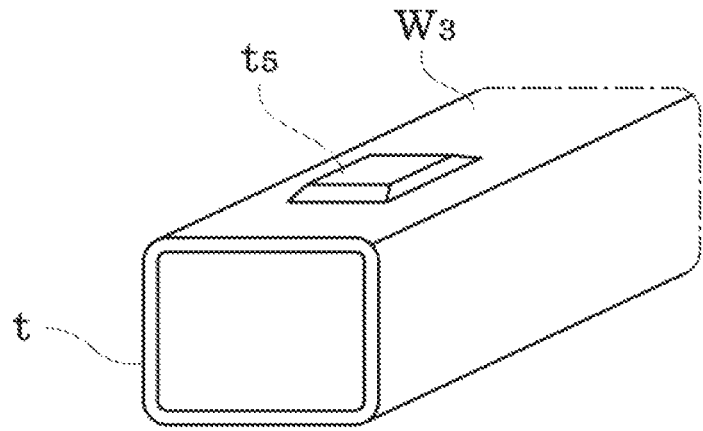
FIG. 4C          FIG. 4B
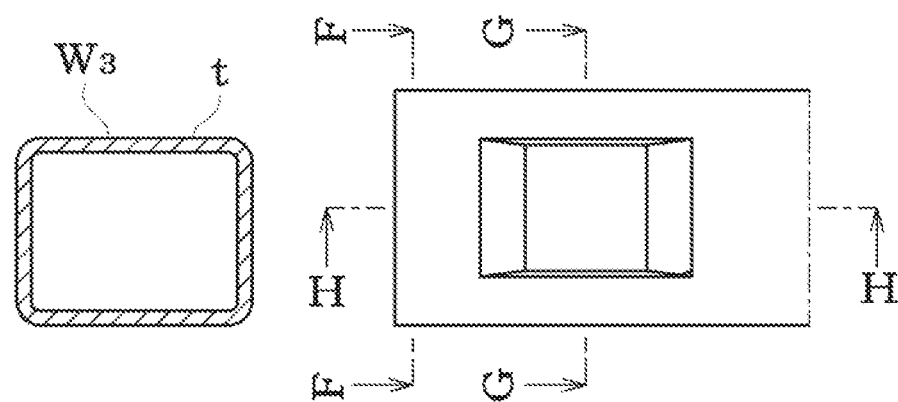
FIG. 4D          FIG. 4E
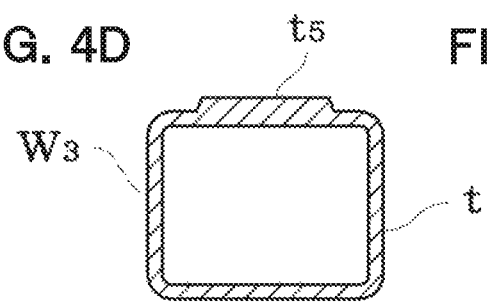   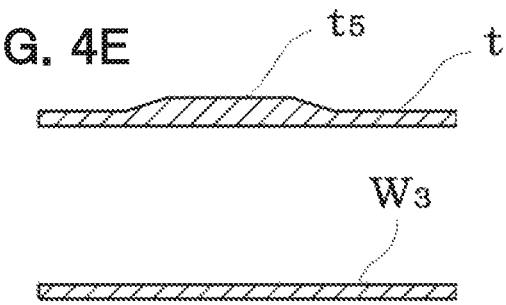
FIG. 4F          FIG. 4G
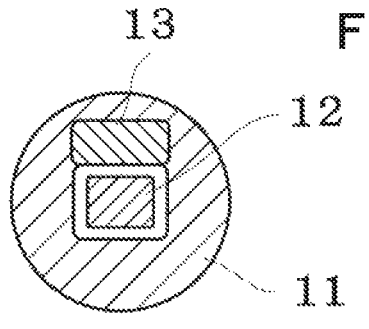   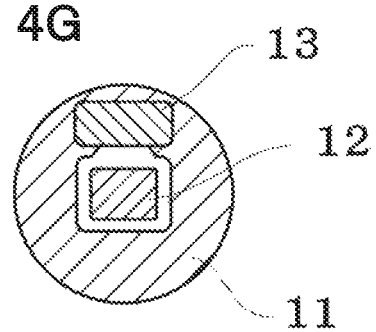

STRUCTURAL MEMBER

CROSS REFERENCE TO RELATED APPLICATION

This application is a continuation of International Patent Application No. PCT/JP2017/042519, having an international filing date of Nov. 28, 2017, which designated the United States, the entirety of which is incorporated herein by reference. Japanese Patent Application No. 2016-232771 filed on Nov. 30, 2016 is also incorporated herein by reference in its entirety.

BACKGROUND

The present disclosure relates to a structural member for vehicles and the like, and more particularly to a structural member using an extruded material such as aluminum alloy.

In the field of vehicles, structural members are required to have reduced weight while ensuring strength and rigidity for particular applications.

One of the methods under consideration to reduce weight is to replace iron-based materials with light alloy, such as aluminum, aluminum alloy, magnesium or magnesium alloy.

Simply replacing materials, however, can reduce weight only to a limited extent. For this reason, recent consideration has been given to the use of a material having a partially varied thickness, which is sometimes called a tailored blank material.

However, a different thickness tailored blank material has conventionally been formed by stacking plate materials at some positions thereof or by butt-joining plate materials with different thicknesses. This means that the conventional different thickness tailored blank material is susceptible to quality problems such as weakened strength due to distortion or heat influence during a joining process (JP-A-2001-122154, JP-A-2003-039120 and JP-B-3996004). Meanwhile, JP-B-4216617 and JP-B-4611158 propose varying a cross-section of an extruded material by extruding and post-processing or the like, taking an advantage of a high degree of flexibility in cross-section of the extruded material.

However, each of the materials disclosed in these publications has a uniform wall thickness in a longitudinal direction, which is an extrusion direction, and thus has unnecessary, excess thickness at some positions thereof. Hence weight reduction has not been fully achieved.

BRIEF DESCRIPTION OF THE DRAWINGS

FIG. 1A is a perspective view, and FIG. 1B is a cross-sectional view of positions A, B, and C.

FIG. 3A is a side view, FIG. 3B is a perspective view, FIG. 3C is a cross-sectional view taken along the line D-D, and FIG. 3D is a cross-sectional view taken along the line E-E.

FIGS. 4A to 4G illustrate examples of the structural member $W_3$. FIG. 4A is a perspective view, FIG. 4B is a plan view, FIG. 4C is a cross-sectional end view taken along the line F-F, FIG. 4D is a cross-sectional end view taken along the line G-G, FIG. 4E is a cross-sectional end view taken along the line H-H, and FIGS. 4F and 4G schematically illustrate an exemplary structure of a die.

FIG. 5A is a perspective view, FIG. 5B is a front view, FIG. 5C is a cross-sectional end view taken along the line I-I, FIG. 5D is a cross-sectional end view taken along the line J-J, and FIGS. 5E and 5F illustrate an exemplary structure of a die.

DESCRIPTION OF EXEMPLARY EMBODIMENTS

Figure 1A:
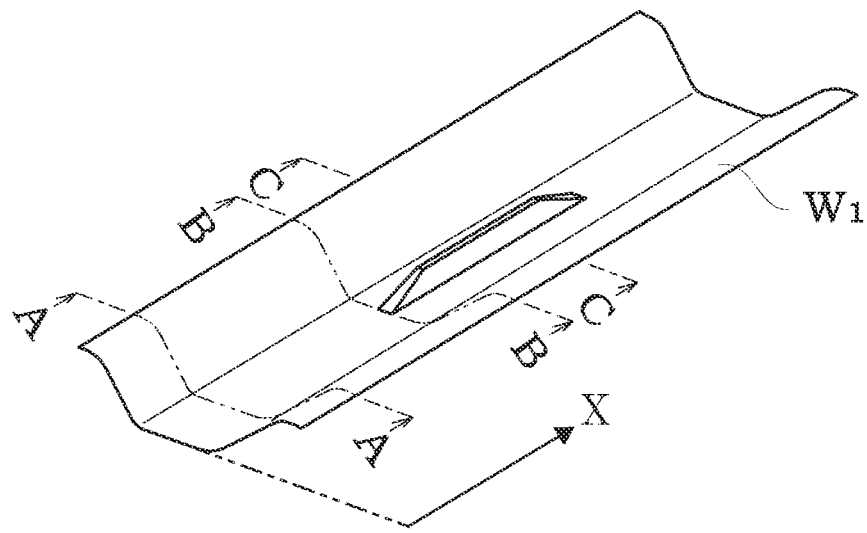
FIGS. 1A and 1B illustrate examples of a vehicle structural member using the structural member according to the disclosure.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

The disclosure aims to provide a structural member made of an extruded material that effectively helps to reduce weight while ensuring strength and rigidity.

The structural member made of an extruded material according to the disclosure has a varied wall thickness along the extrusion direction.

Here, extrudable light alloy, such as aluminum, aluminum alloy, magnesium or magnesium alloy, is used for the extruded material.

Examples of the aluminum alloy include JIS 6000 and 7000 series aluminum alloy. Methods for varying the wall thickness along the extrusion direction include, but not limited to, mechanically varying aperture dimensions of an extrusion die in a wall thickness direction, and subjecting the extruded material to post-processing after extrusion, such as applying roll pressure and cutting.

In the disclosure, an extruded cross-section may be varied along the extrusion direction.

Assuming that a position in the extrusion direction is represented by an X-coordinate, and that a product allowable stress is σa, a section modulus is Z(x), a cross-sectional area is A(x) and a generated bending moment is M(x) at a given position x, the disclosure has a feature in that the section modulus obtained by the formula: Z(x)=M(x)/σa is varied according to a position of the position x by varying a wall thickness along the extrusion direction or by varying a cross-section (a cross-section perpendicular to the extrusion direction) so that the cross-sectional area A(x) is minimized.

As a prerequisite, the generated bending moment is equal to or less than a maximum allowable bending moment Mmax(x) on that position.

Cross-sectional wall thickness of the conventional tailored blank material is varied by stacking plate materials or joining plate materials with different thicknesses, and accordingly a main material of the product in the longitudinal direction has a constant cross-sectional thickness. This results in the product having excess section modulus at some positions thereof.

In contrast, taking an advantage of a high degree of flexibility in cross-section of an extruded shape, the disclosure varies a wall thickness and a shape along the extrusion direction (longitudinal direction) to minimize a cross-sectional area of the extruded shape according to an optimal section modulus for bending moment on a given position of the extruded shape. The disclosure thus helps to achieve further weight reduction.

The structural member according to the disclosure can be used for various structural members of automobiles.

Examples of the vehicle structural members include a reinforcement for pillars, members forming a vehicle body, a roof side reinforcement, a rocker panel reinforcement, a door beam, and a bumper reinforcement.

The structural member may have various cross-sectional shapes including solid, semi-hollow, and hollow cross-sections.

Figure 1B:
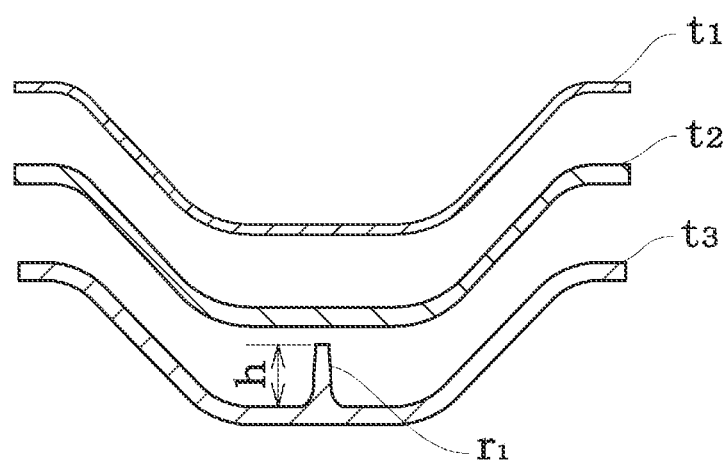

FIGS. 1A and 1B illustrate examples of the structural member $W_1$ having a solid cross-section.

FIG. 1B illustrates cross-sections at the positions A, B, and C illustrated in FIG. 1A.

Assuming that an extrusion direction of an extruded material is represented by an X-coordinate, the positions A, B, and C corresponds to positions X(A), X(B), and X(C), respectively.

The wall thickness varies at each position, and a rib that is integrally formed at the central part of the bottom also has a varied height h.

In the present embodiment, the central position in a longitudinal direction is applied with the largest bending stress.

In view of this, a wall thickness $t_2$ of the position X(B) is made larger than a wall thickness $t_1$ of the position X(A).

Further, the rib $r_1$ is provided only on the central part in the longitudinal direction, and the height h of the rib $r_1$ is gradually lowered from the position X(C) to the position X(B). No rib is provided on a position closer to a longitudinal end than the position X(B) is.

This design makes the section modulus varied according to the value of stress applied to each position, so that the cross-sectional area can be minimized.

The structural member illustrated in FIGS. 1A and 1B may have its shape further changed by pressing or other methods after extrusion.

Figure 2:
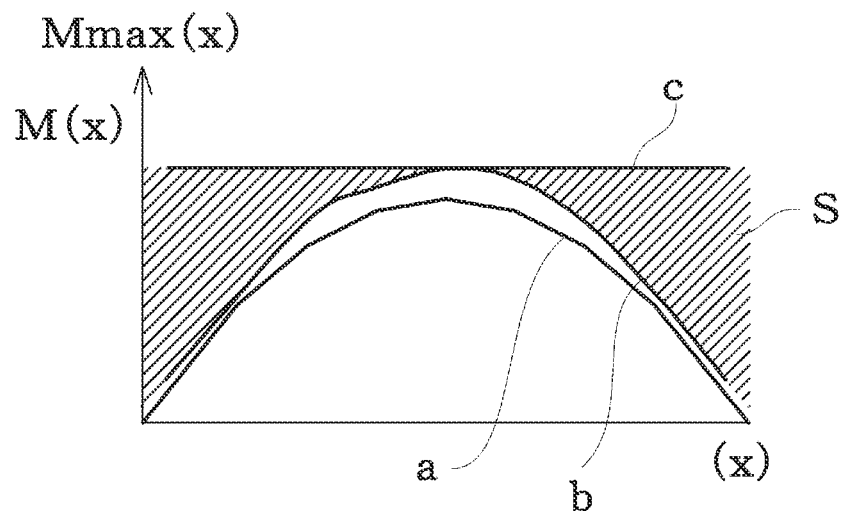
FIG. 2 illustrates relationship between a generated bending moment M(x) in each position (x) of the product illustrated in FIGS. 1A and 1B and a maximum allowable bending moment Mmax(x).
Figure 3A:
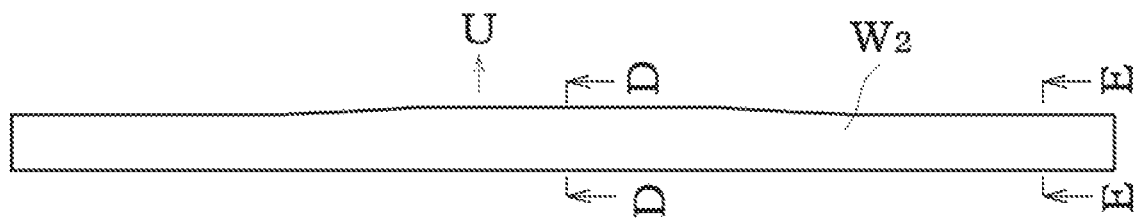
FIGS. 3A to 3D illustrate examples of the structural member $W_2$.
Figure 3B:
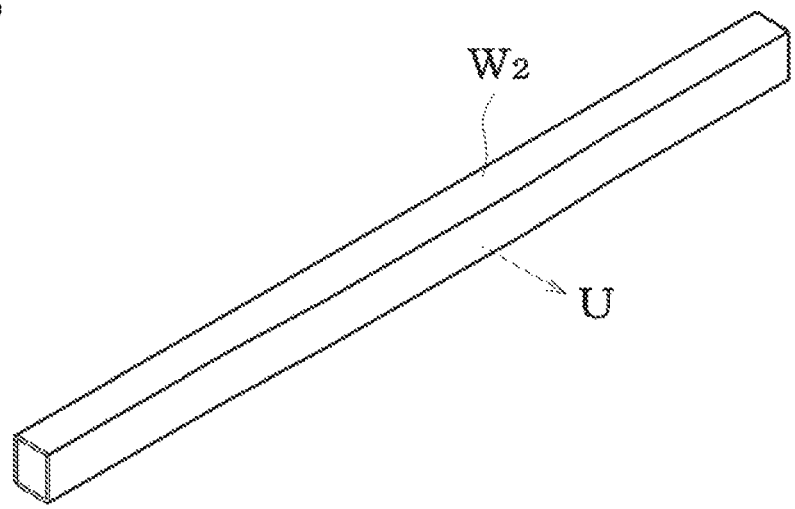
Figure 3C:
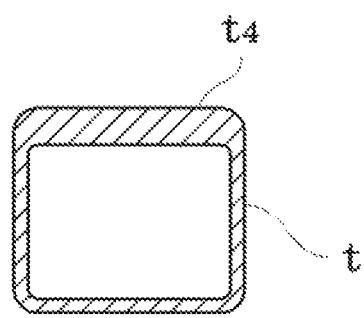
Figure 3D:
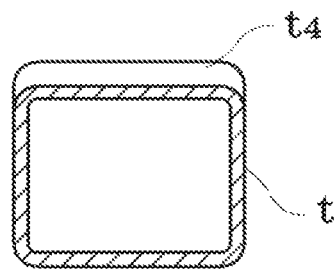

FIG. 2 schematically illustrates relationship between the position x of the structural member $W_1$ illustrated in FIGS. 1A and 1B, a generated bending moment M(x), and a maximum allowable bending moment Mmax (x) on that position.

The graph "a" illustrates changes in the generated bending moment M(x) on the position (x), and the graph "b" illustrates transition of the maximum allowable bending moment Mmax (x).

The straight line "c" corresponds to an allowable bending moment when the cross-sectional area is constant, and therefore the area of the portion "S" indicated by hatching contributes to weight reduction.

FIGS. 3A to 3D illustrate examples of the structural member $W_2$.

This is an example of a structural member with a hollow cross-section having a wall thickness $t_4$ on the upper (U) side that is gradually larger than a wall thickness "t" of a general section.

FIGS. 4A to 4G illustrate examples where a side wall thickness (thick section) $t_5$ of the structural member $W_3$ with a hollow cross-section is made partially larger than a general wall thickness "t".

An exemplary structure of a die for extrusion molding of this structural member $W_3$ is illustrated in FIGS. 4F and 4G.

The die includes an outer die 11 for forming an outer shape of the structural member $W_3$ and an inner die 12 for forming an inner shape of the structural member $W_3$. These dies are connected with a bridge or the like.

A movable die 13 is provided on a part of the outer die 11, and changing the state or the position of the movable die 13 from the position shown in FIG. 4F to the position shown in FIG. 4G allows to continuously form the thick section is of the extruded material.

FIGS. 5A to 5F illustrate examples of the structural member $W_4$ having a varied outer shape and a varied thickness.

Figure 5A:
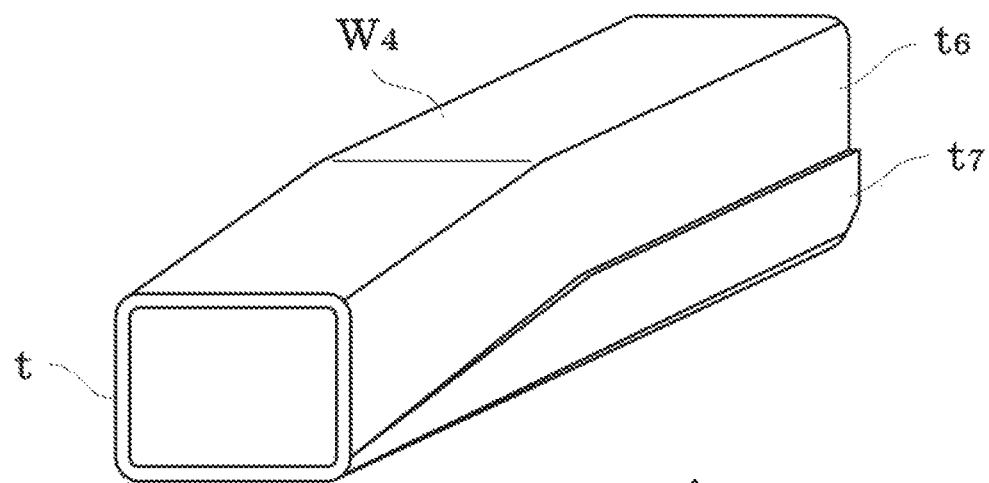
FIGS. 5A to 5F illustrate examples of the structural member $W_4$.
Figure 5B:
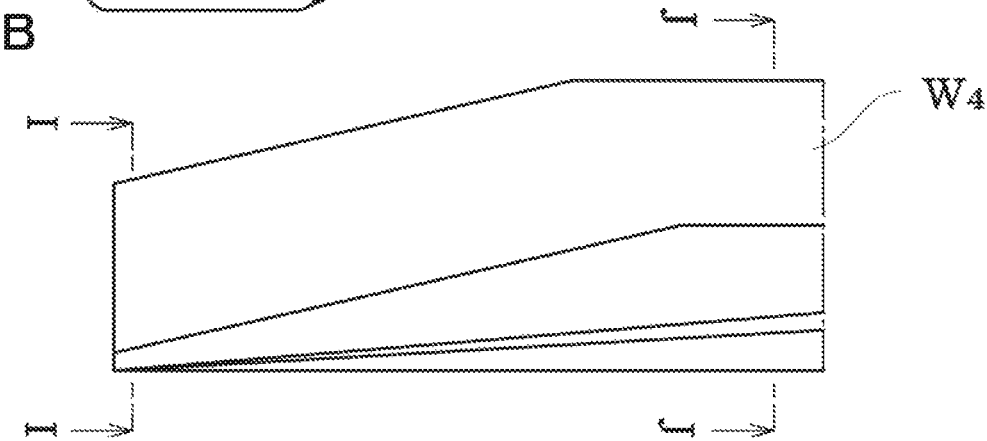
Figure 5C:
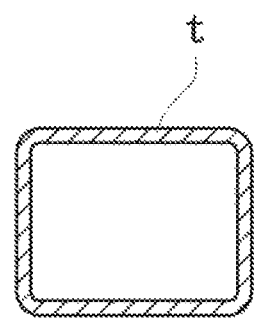
Figure 5D:
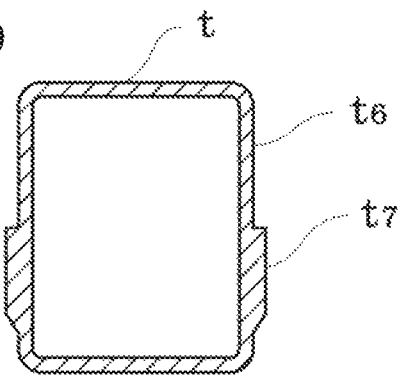
Figure 5E:
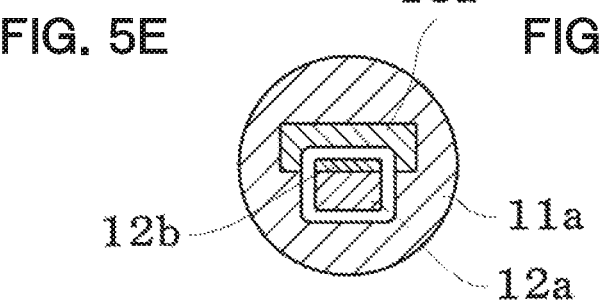
Figure 5F:
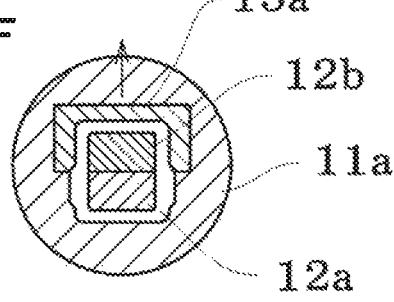

As illustrated in FIGS. 5E and 5F, a movable die 13a is provided on an outer die 11a, and a movable die 12b is also provided on an inner die 12a. The movable die 13a and the movable die 12b are able to move so as to change the cross section thereof from that shown in FIG. 5E to that shown in FIG. 5F. This allows to form an elongated thick side wall section $t_6$ and an elongated thick section $t_7$.

Continuously and gradually varying the wall thickness and outer shape along the extrusion direction in this way can produce various structural members with reduced weight and optimal cross-sections.

The structural member according to the disclosure can be used for various structural members that require strength and reduced weight, including vehicle components, vehicle structural members, and frame members of machines.

What is claims is:

1. A structural member made of an extruded material, wherein the structural member has a varied wall thickness in a height direction along an extrusion direction, assuming that a position in the extrusion direction is represented by an X-coordinate, and that a product allowable stress is σa, a section modulus is Z(x), a cross-sectional area is A(x) and a generated bending moment is M(x) at a given part x, the wall thickness of the structural member is thickest at a center position in the extrusion direction where the bending moment M(x) is largest while minimizing the cross-sectional area A(x) when the section modulus obtained by a formula: Z(x)=M(x)/σa is varied according to a position of the part x.

2. The structural member made of an extruded material according to claim 1, wherein the structural member has a rib at a center portion in the extrusion direction.

3. The structural member made of an extruded material according to claim 2, wherein, assuming an end position in the extrusion direction is X(A), the central position in the extrusion direction is X(C) and a middle position between the positions X(A) and X(C) in the extrusion direction is X(B), a height of the rib is gradually lowered from the position X(C) toward to the position X(B) and a wall thickness of the position X(B) is made larger than a wall thickness of the position X(A).

* * * * *